United States Patent [19]

Jeng

[11] Patent Number: 5,594,215
[45] Date of Patent: Jan. 14, 1997

[54] WIRELESS DIGITIZER AND STYLUS PEN UNIT

[76] Inventor: James H. Jeng, No. 5, Lane 50, Ming Tsu Rd., Tamshui Chen, Taipei Hsien, Taiwan

[21] Appl. No.: 375,733

[22] Filed: Jan. 20, 1995

[51] Int. Cl.$^6$ .................................................. G08C 21/00
[52] U.S. Cl. ............................................................ 178/19
[58] Field of Search ........................ 178/18, 19; 345/156, 345/173, 174; 364/729.1, 729.11

[56] References Cited

U.S. PATENT DOCUMENTS

| | | | |
|---|---|---|---|
| 4,210,775 | 7/1980 | Rodgers et al. | 178/19 |
| 4,707,845 | 11/1987 | Krein et al. | 178/19 |
| 4,723,056 | 2/1988 | Tamaru et al. | 178/19 |
| 4,837,716 | 6/1989 | Chia-Hui | 178/19 |
| 5,023,408 | 6/1991 | Murakami et al. | 178/19 |
| 5,218,174 | 6/1993 | Gray et al. | 178/19 |

Primary Examiner—Wellington Chin
Assistant Examiner—Paul Loomis
Attorney, Agent, or Firm—Varndell Legal Group

[57] ABSTRACT

A digitizer and stylus pen unit including a winding type conductor loop, a conductor pen or cursor, and a central processing unit, wherein when the signal input device is started to provide an oscillatory signal and a TX/RX control signal to a TX/RX control circuit for driving the winding type conductor loop, the central processing unit scans the transmission through a scanning circuit and the winding type conductor loop carries the oscillatory signal to the stylus pen, causing the stylus pen induced; the signal obtained from the relative position between the winding type conductor loop and the induced stylus pen is treated through signal amplifiers and filters, and then divided into two signals, permitting a first signal to be transmitted through two ways, to be transmitted through a gain amplifier, a schmitter trigger, and a data counter, and then to the central processing unit through a data buffer for calculating the X-axis and Y-axis coordinate values, and permitting a second signal to be transmitted through a voltage level hold circuit and an A/D converter to the central processing unit via a data buffer for calculating the Z-axis coordinate value.

4 Claims, 3 Drawing Sheets

WIRELESS DIGITIZER AND STYLUS PEN UNIT

BACKGROUND AND SUMMARY OF THE INVENTION

The present invention relates to a digitizer and stylus pen unit, and relates more particularly to a wireless digitizer and stylus pen unit.

Regular digitizer and stylus pen units are divided into four groups, namely, the battery added digitizer and stylus pen units, the rechargeable wireless digitizer and stylus pen units, the LC resonance type digitizer and stylus pen units, and the infrared induction type digitizer and stylus pen units. A battery added digitizer and stylus pen unit is not convenient in use because the stylus pen is huge and the wireless digitizer and stylus pen unit is also not convenient in use because the battery must be regularly charged. Furthermore, the battery added digitizer and stylus pen units and the rechargeable wireless digitizer and stylus pen units tend to produce an error action when the voltage level of the battery is weak. The drawback of LC resonance type digitizer and stylus pen units is that the out put signal of the stylus pen is a modulated signal which tends to be interfered by external radio waves. Infrared induction type digitizer and stylus pen units are also not satisfactory in function because of the limitation of infrared induction. Because the digitizer of an infrared induction type digitizer and stylus pen unit has a dead angle on the induction of infrared rays, and induction failure tends to occur during the operation of the unit. This problem is more apparent on a big scale infrared induction type digitizer and stylus pen unit.

The present invention has been accomplished to provide a wireless digitizer and stylus pen unit which eliminates the aforesaid drawbacks. According to one aspect of the present invention, winding type conductor loop is provided to act with the stylus pen through the change of a magnetic field, and therefore the problems of the installation of an added battery and the performance of charging a rechargeable battery are eliminated. According to another aspect of the present invention, the induction between the winding type conductor loop and the stylus pen is the change of a magnetic field but not the change of a frequency, therefore the induction is free from the interference of external radio waves and does not interfere with other computer peripheral equipment. According to still another aspect of the present invention, a voltage level hold circuit is operated with an A/D converter and a data buffer to provide the central processing unit with Z-axis coordinate value, and therefore three-dimensional character and graphic designs can be achieved by means of the changes on Z-axis, Y-axis, and Z-axis.

DETAILED DESCRIPTION OF THE PREFERRED EMBODIMENT

Figure 1:
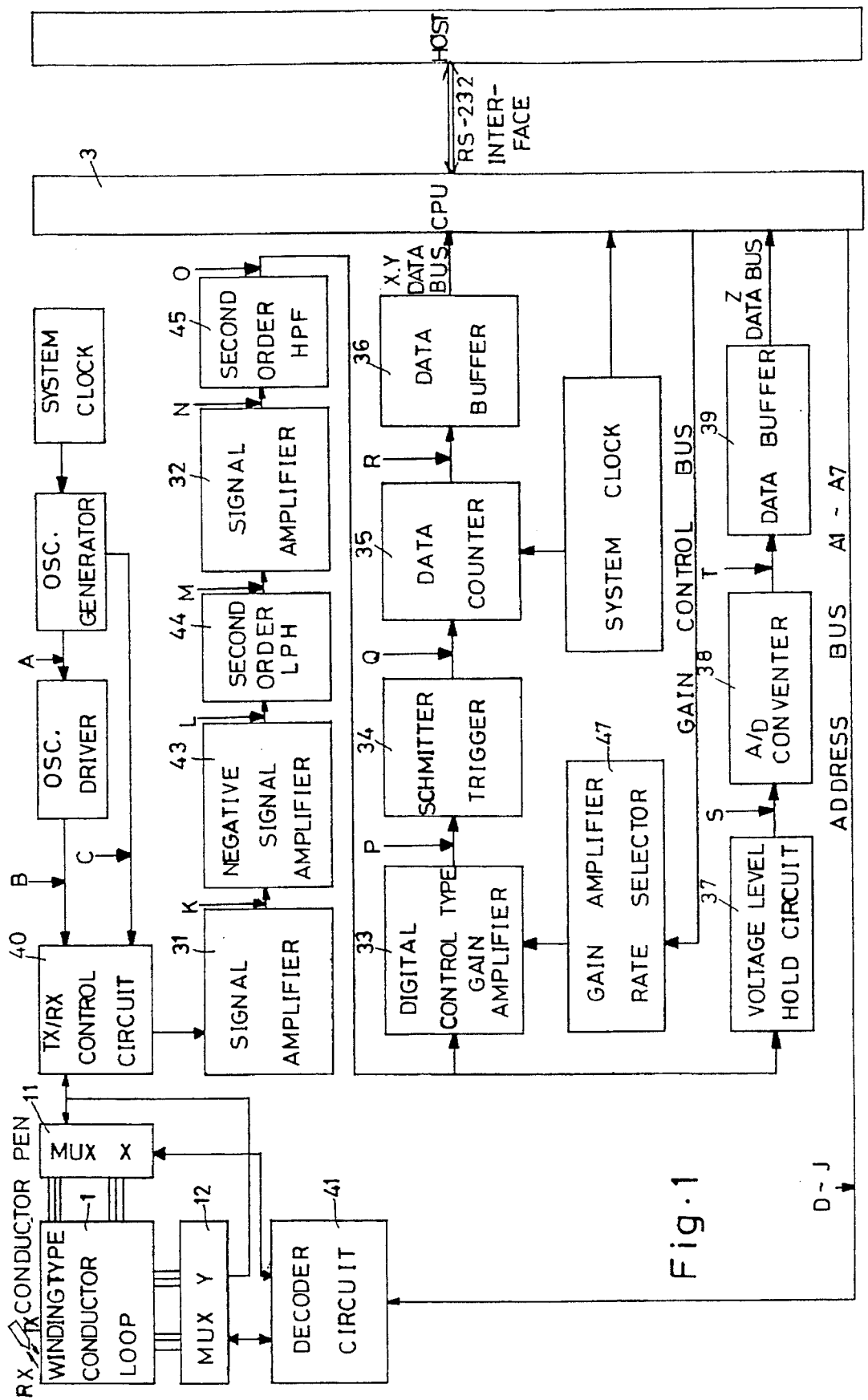
FIG. 1 is circuit block diagram for a wireless digitizer and stylus pen unit according to the present invention.
Figure 2:
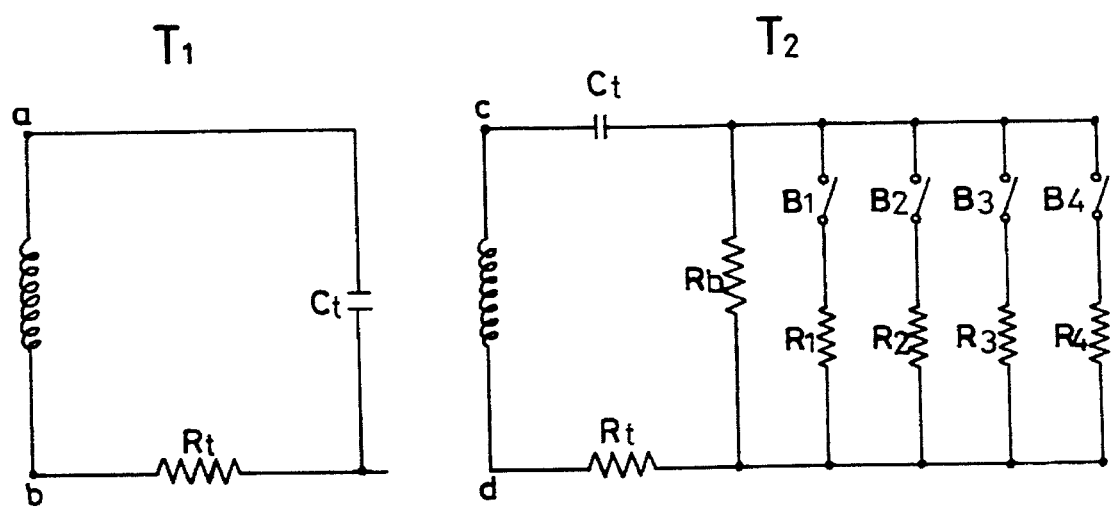
FIG. 2 is a circuit diagram of a conductor pen according to the present invention.
Figure 3:
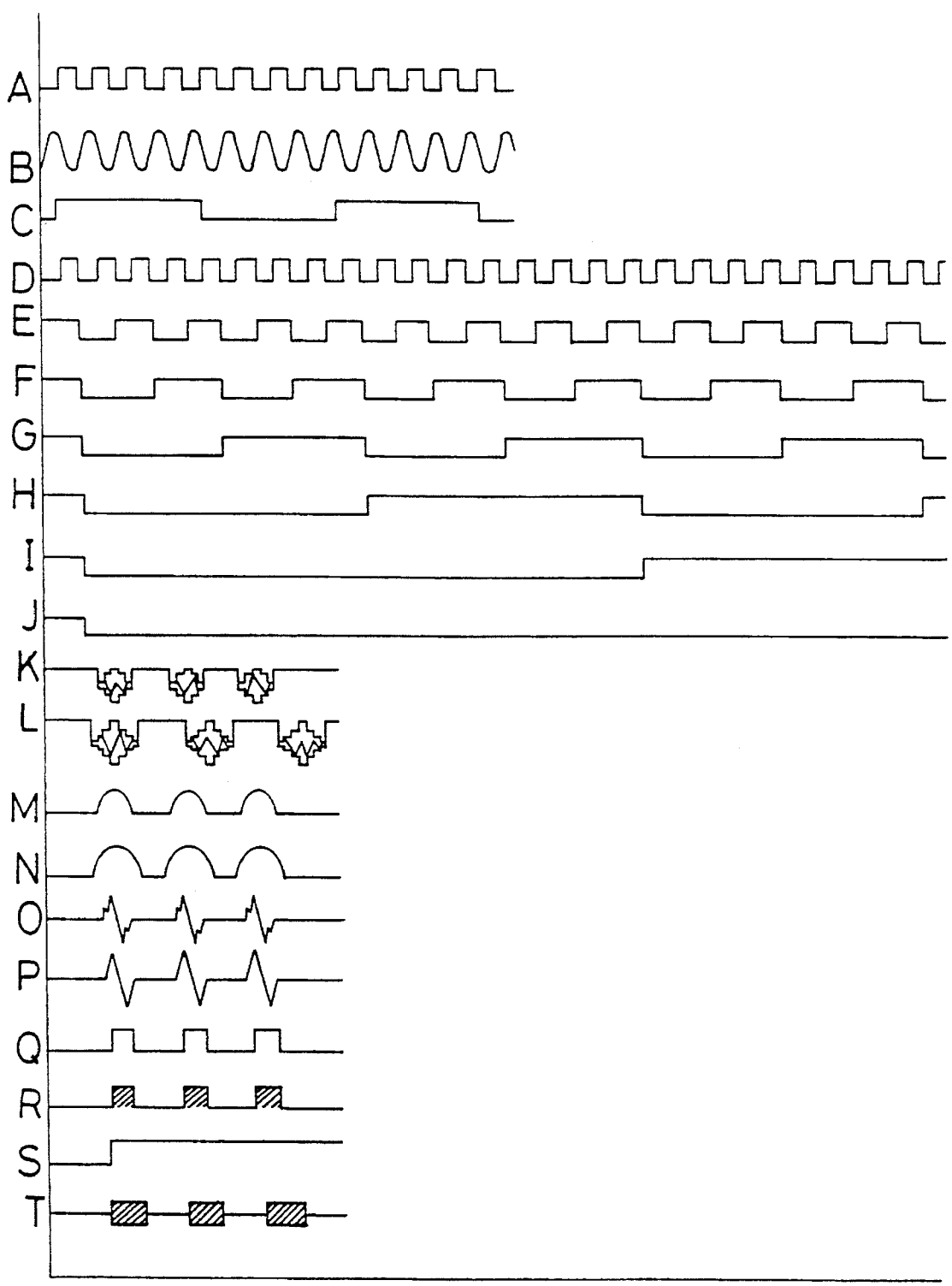
FIG. 3 a wavelength curve according to the present invention.

Referring to FIGS. 1 through 3, a wireless digitizer and stylus pen unit in accordance with the present invention is generally comprised of a winding type conductor loop 1, a conductor pen (stylus pen) 2 or cursor (not shown), a central processing unit 3 (hereafter referred CPU), signal amplifiers 31 and 32, a digital control type gain amplifier 33, a schmitter trigger 34, a data counter 35, a first date buffer 36, a voltage level hold circuit 37, an A/D converter 38, a second data buffer 39, a TX/RX control circuit 40, a decoder circuit 41, a X-multiplexer 11, a Y-multiplexer 12, a negative signal amplifier 43, a second order low pass filter 44 (hereafter referred LPF), a second high pass filter 45 (hereafter referred HPF, and a gain amplifier rate selector 47.

When the signal input device is started, its oscillation generator provides an oscillatory signal (as shown by A and B wavelength curve in FIG. 3) and a TX/RX control signal (as shown by C wavelength curve in FIG. 3) to the TX/RX control circuit 40 for driving the winding type conductor loop 1, and the CPU 2 scans the transmission through a scanning circuit, which consists of the decoder circuit 41, the X-multiplexer 11, and the Y-multiplexer 12, and at the same time the winding type conductor loop 1 transmits (as shown by D, E, F, G, H, I and J wavelength curve in FIG. 3) the high-frequency oscillatory signal to the conductor pen 2, enabling the conductor pen 2 to carry an oscillation source. When the TX/RX clock is turned from high to low, the winding type conductor loop 1 serves as a receiver loop to receive the location current from the conductor pen 2, permitting it to be amplified by the first signal amplifier circuit 31 (as shown by K wavelength curve in Figure) and the negative signal amplifier 43 in proper order, and then transmitted to the second order LPF 44, which eliminates noises from the negative signal (as shown by L wavelength curve in FIG. 3) and then amplifies the filtrated negative signal (as shown by M wavelength curve in FIG. 3). The well amplified negative signal is then amplified by the second signal amplifier 32 (as shown by N wavelength curve in FIG. 3), and then filtrated by the second order HPF 45 (as shown by 0 wavelength curve in FIG. 3). The output signal from the second order HPF 45 is then transmitted through the digital control type gain amplifier 33 and the voltage level hold circuit 37. If the conductor pen 2 is moved at a fixed high potential when the signal from the second order HPF 45 is transmitted to the digital control type gain amplifier 33, the gain is maintained at the initial fixed gain amplification ratio. If the potential of the conductor pen 2 is change, the CPU 3 will give a different amplification parameter to maintain the conductor pen 2 at the same location, and therefore the coordinate value will not be changed due to a potential difference (more particularly when an oscillatory signal of different voltage value is produced after the conductor pen 2 was depressed, different X-axis and Y-axis values will be produced at the same location, however the digital control type gain amplifier 33 will give a different gain parameter subject to the Z-axis value, so that the X-axis and Y-axis values of the conductor pen 2 can be maintained unchanged upon the operation of the conductor pen 2 or a pressure on the conductor pen 2). The output signal (as shown by P wavelength curve in FIG. 3) of the digital control type gain amplifier 33 is converted into a digital signal by the schmitter trigger 34 (as shown by Q wavelength curve in Figure), then carried into the system time sequencing signal by the data counter 35 (as shown by R wavelength curve in FIG. 3), and then transmitted to the data buffer 36 through which the X-axis and Y-axis values are further transmitted to the CPU 3. According to the data received from the data buffer 36, the CPU 3 calculates the coordinates of the conductor pen 2. The signal from the aforesaid second order HPF 45 is simultaneously transmitted to the voltage level hold circuit 37, permitting the analog signal to be converted into a voltage level signal. The voltage level signal from the voltage level hold circuit 37 is then converted by the A/D converter 38 into a Z-axis digital data, which is further sent through the second data buffer 39 to the CPU 3. Therefore, the CPU obtains the Z-axis coordinate value of the conductor pen 2. When the CPU 3 receives the X-axis, Y-axis and Z-axis coordinate values, it can transmit data to the host through a RS-232 interface for further processing.

Referring to FIG. 2, the conductor pen 2 comprises a coil disposed around an iron core, a plurality of capacitors Ct, and a plurality of resistors Rt. When the TX/RX control circuit 40:5 turned to the TX mode and the control circuit of the conductor pen 2 is placed on the winding type conductor loop 1, the coil is induced by the high frequency oscillating source of the winding type conductor loop 1, permitting the oscillationg source signal to be transmitted to a L.C.R. (inductor, capacitor, resistor) turner circuit. The L.C.R. tuner circuit receives the oscillating source signal, and starts to discharge only when the TX/RX control circuit 40 is turned from the TX mode the the RX mode. The conductor pen 2 performs the action of receiving and transmitting the oscillating source subject to the transmitting or receiving operation of the TX/RX control circuit 40.

In FIG. 2, T1 is comprised of a L.C.R. tuner circuit to receive the socillating source from the winding type conductor loop 1; T2 is comprised of a L.C.R. turner circuit, which is to receive the oscillating source from the winding type conductor loop 1, and a Button On/Off circuit consisting of Rb, R1, R2, R3, R4, B1, B2, B3, and B4. When the Button On/Off circuit does no work, the L.C.R. tuner circuit of T2 receives an oscillatory signal. When the button B1 is ON, Rb an d R1 are electrically connected in parallel, causing electric current at both ends of Rb increased, and the voltage of the oscillatory signal is increased. Therefore, through the operation of the voltage level hold circuit 37 shown in FIG. 1, a potential difference is produced for the recognition of the On/Off position of the button B1. The operation of the other buttons B2 through B4 are similar to that of the button B1.

The aforesaid T1 and T2 are spaced by a space D. When T2 approaches TI, the oscillatory signal induced by T1 will be dispersed through T2, causing the oscillatory signal recuded. When T2 is moved away from T1, the oscillatory signal at T1 is maintained at the maximum level. Therefore, by changing the distance D between T1 and T2, the intensity of the oscillatory signal at T1 is controlled. The changes of the intensity of the oscillatory signal at T1 is processed through the aforesaid voltage level hold circuit 37 and A/D converter 38 to produce different coordinate values. Therefore, when the distance D is changed, the pressure level of the conductor pen 2 is relatively changed, and the thickness of the line drawn by the conductor pen 2 on the winding type conductor loop is relatively changed.

I claim:

1. A digitizer and stylus pen unit comprising a winding type conductor loop, a inductor device, a central processing unit, a first signal amplifier, a second signal amplifier, a digital control type gain amplifier, a schmitter trigger, a data counter, a first data buffer, a voltage level hold circuit, an A/D converter, a second data buffer, a TX/RX control circuit, a decoder circuit, a X-multiplexer, a Y-multiplexer, a negative signal amplifier, a second order low pass filter, a second order high pass filter and a gain amplifier rate selector, wherein when the signal input device is started to provide an oscillatory signal and TX/RX control signal to said TX/RX control circuit for driving said winding type conductor loop, said central processing unit scans the transmission through a scanning circuit, which consists of said decoder circuit, said X-multiplexer, and said Y-multiplexer, and at the same time said winding type conductor loop transmits the high-frequency oscillatory signal to said inductor device, enabling said inductor device to carry an oscillation source; when the TX/RX clock is turned from high to low, said winding type conductor loop serves as a receiver loop to receive the location current from said conductor device, permitting it to be amplified by said first signal amplifier circuit and said negative signal amplifier in proper order, and then transmitted to said second order low pass filter, which eliminates noises from the negative signal and then amplifies the filtrated negative signal, the well amplified negative signal being then amplified by said second signal amplifier, and then filtrated by said second order high pass filter, the output signal from said second order high pass filter being then transmitted through said digital control type gain amplifier and said voltage level hold circuit; if said conductor device is moved at a fixed high potential when the signal from said second order high pass filter is transmitted to said digital control type gain amplifier, the gain is maintained at the initial fixed gain amplification ratio; if the potential of said conductor device is changed, said central processing unit will give a different amplification parameter to maintain said conductor device at the same location, and therefore the coordinate value will not be changed due to a potential difference (more particularly when an oscillatory signal of different voltage value is produced after said conductor device is depressed, different X-axis and Y-axis values will be produced at the same location, however the digital control type gain amplifier will give a different gain parameter subject to the Z-axis value, so that the X-axis and Y-axis values of said conductor device can be maintained unchanged upon the operation of said conductor device or a pressure on said conductor device); the output signal from said digital control type gain amplifier is converted into a digital signal by said schmitter trigger, then carried into the system time sequencing signal by said data counter, and then transmitted to said data buffer through which the X-axis and Y-axis values are further transmitted to said central processing unit, said central processing unit calculates the coordinates of said conductor device according to the data received from said data buffer; the signal from said second order high pass filter is simultaneously transmitted to said voltage level hold circuit, permitting the analog signal to be converted into a voltage level signal, the voltage level signal from said voltage level hold circuit being then converted by said A/D converter into a Z-axis digital data, which is further sent through said second data buffer to said central processing unit; when said central processing unit receives the X-axis, Y-axis and Z-axis coordinate values, it can then transmit data to the host through a RS-232 interface for further processing.

2. The digitizer and stylus pen unit of claim 1 wherein said inductor device comprises a coil disposed around an iron core, a plurality of capacitors, and a plurality of resistors; when said TX/RX control circuit is turned to the TX mode and said inductor device is placed on said winding type conductor loop, the coil of said inductor device is induced by the high frequency oscillating source produced by said winding type conductor loop, permitting the oscillating source signal to be transmitted to a L.C.R. tuner circuit, which receives the oscillating source signal and, which starts to discharge only when said TX/RX control circuit is turned from the TX mode to the RX mode; said inductor device performs the action of receiving and transmitting the oscillating source subject to the transmitting or receiving operation of said TX/RX control circuit; said inductor device includes T1 and T2, said T2 comprised of a L.C.R. tuner circuit for receiving the oscillating source from said winding type conductor loop, said T2 comprised of a L.C.R. tuner circuit for receiving the oscillating source from said winding type conductor loop, and a button On/Off circuit consisting of Rb, R1, R2, R3, R4, B1, B2, B3, and B4; the L.C.R. turner circuit of said T2 receives an oscillatory signal when said button On/Off circuit does no work said Rb and said R1 being electrically connected in parallel, when the button B1 of said button On/Off circuit is depressed, causing electric current at both ends of Rb increased so that the voltage of the oscillatory signal is increased and, a potential difference is produced by means of the operation of said voltage level hold circuit, for the recognition of the On/Off position of the button B1; the operation of the other buttons B2 through B4 of said button On/Off circuit are same as that off the button B1; said T1 and said T2 are spaced by a space D so that when said T2 approaches said T1, the oscillatory signal induced by said T1 is dispersed through said T2, causing the oscillatory signal reduced, or when said T2 is moved away from said T1, the oscillatory signal at said T1 is maintained at the maximum level, and therefore, by changing the distance D between said T1 and said T2, the intensity of the oscillatory signal at said T1 is controlled; the changes of the intensity of the oscillatory signal at said T1 is processed through said voltage level hold circuit and said A/D converter to produce different coordinate values, so that when the distance D between said T1 and said T2 is changed, the pressure level of said inductor device is relatively changed, and the thickness of the line drawn by said inductor device on said winding type conductor loop is relatively changed.

3. The digitizer and inductor pen unit of claim 1 wherein said inductor device is a stylus pen.

4. The digitizer and stylus pen unit of claim 1 wherein said inductor device is a cursor.

* * * * *